United States Patent [19]

Ray et al.

[11] 4,322,648

[45] Mar. 30, 1982

[54] PERMANENT MAGNET MOTOR ARMATURE

[75] Inventors: Glen Ray, Big Bend, Wis.; James B. Gollhardt, Shawnee, Okla.

[73] Assignee: Allen-Bradley Company, Milwaukee, Wis.

[21] Appl. No.: 126,885

[22] Filed: Mar. 3, 1980

[51] Int. Cl.[3] .............................................. H02K 21/12
[52] U.S. Cl. .................................................. 310/156
[58] Field of Search ............... 310/156, 152, 162, 163, 310/261

[56] References Cited

U.S. PATENT DOCUMENTS

| | | | |
|---|---|---|---|
| 3,492,520 | 1/1970 | Yates | 310/156 X |
| 4,144,469 | 3/1979 | Miyashita et al. | 310/156 |

Primary Examiner—Donovan F. Duggan
Attorney, Agent, or Firm—Quarles & Brady

[57] ABSTRACT

An armature for electric motors having a magnetic core of stacked laminations mounted on a shaft with a plurality of electrically conductive rotor bars disposed in the magnetic core, and also having a number of arch shaped permanent magnets disposed in the core that are circularly spaced from one another and arranged concentrically with the shaft. Each permanent magnet has a pole of one magnetic polarity on its radially outer face and a pole of opposite polarity on its radially inner face, and is surrounded by magnetic core material at its circumferential ends and radially inner side to form flux return paths, whereby there are two magnetic armature poles for each permanent magnet.

5 Claims, 4 Drawing Figures

PERMANENT MAGNET MOTOR ARMATURE

BACKGROUND OF THE INVENTION (a) The Field of Invention

This invention relates to electric motors and more particularly to armature constructions having permanent magnets that provide magnetic fields for interaction with the magnetic flux of the motor field windings.

(b) The Prior Art

It has been common to employ permanent magnets in electric motors to establish fixed magnetic fields. One application is in small D.C. motors where they are used as field pieces that surround a wound armature to which a D.C. voltage is applied. These field pieces are arcuately shaped, and are circumferentially spaced from one another in closely conforming relation to the armature surface to form an air gap therebetween. Typically, they are mounted on the inside of a magnetic shell which acts as a return path for the magnetic flux of the magnets. The magnets will be alternately polarized with the inner pole faces of the magnets facing the armature being of alternate polarity, so that flux emanating from one magnet will pass through the armature and then return into the circumferentially adjacent magnets. Thus, a pair of magnets are required for each pair of magnetic poles.

Another application of permanent magnets in electric motors is for synchronous A.C. motors. Here, the permanent magnets are usually mounted in a rotating armature that is surrounded by the A.C. field windings of the motor stator. These motors find use in drive systems for diverse applications such as in film processing, the fiber industry, and the like. Also, by varying the input frequency to the field windings variable speed drive systems can be provided.

In prior A.C. synchronous motors the permanent magnets have been arranged in such fashion that it requires a pair of magnets to develop a pair of magnetic poles. In a two pole design, for instance, a pair of arcuate shaped magnets are embedded in the armature which are diametrically opposite one another. The outer face of one magnet presents a positive magnetic pole and the outer face of the other magnet presents a negative magnetic pole. The magnetic flux path has the two magnets in series relation, and the flux path extends diametrically across the armature to include the region of the motor shaft. In many applications the shaft becomes magnetized, or is of a special non-magnetic material to avoid magnetization.

In another A.C. synchronous motor design the permanent magnets in the rotor are circularly spaced from one another and their magnetic pole faces are arranged to face circularly within the rotor, instead of in a radial direction. Poles of like polarity of adjacent magnets face one another, so that the magnetic flux pattern will develop poles at the armature surface which are centered between magnets. In such a structure the magnetic flux of the permanent magnets also tends to develop return paths through the central core of the armature, as well as across the working air gap of the motor, and special design is required to block such unwanted flux paths in the central regions of the armature.

SUMMARY OF THE INVENTION

The present invention resides in an armature structure containing permanent magnets in which the magnets are arranged so that each magnet presents a radially facing magnetic pole directed radially toward the armature surface, and the armature also includes magnetic return paths around the circularly facing ends of each magnet for conducting magnetic flux to a magnetic pole on the radially inner side of the magnet.

In this arrangement all the magnets present the same magnetic polarity at their radially outer faces. Magnetic poles of the opposite polarity are established at regions along the armature surface located between the magnets. As a result, two magnetic working poles are presented at the armature surface for each permanent magnet embedded in the armature. Thus, for a four pole armature only two permanent magnets are required to establish the four poles. This contrasts with prior designs in which the magnets are arranged with their pole surfaces facing in a circular direction, and two magnets are required for each set of magnetic poles at the armature surface. The number of permanent magnets required is halved from such former designs, and the circular spacing between magnets can be enlarged to provide substantial flux paths of magnetic iron linking with the magnets. The magnetic drops in the magnetic circuit may be largely concentrated in the working air gaps of the motor to have an efficient design. Also, because of the decrease in their number, each permanent magnet can be relatively large so that physically strong magnets of optimum design can be employed.

Since the magnetic poles on the radially outer faces of the magnets are of like polarity, the radially inner faces are also of like polarity. These inner faces are disposed in a circular relationship within the armature core and have a magnetic repelling effect upon one another. This inhibits magnetic flux from crossing the center of the armature or entering the central region occupied by the armature shaft. It is not necessary to design the armature laminations with flux barriers at the center to inhibit cross over of flux between magnets, and the central region is magnetically neutral so that a steel shaft can be employed without becoming magnetized.

It is an object of the invention to provide an armature with permanent magnets that are magnetically in parallel relation with one another and to orient the magnets with radially outwardly directed magnetic poles.

It is another object of the invention to provide an armature employing permanent magnets in which the magnetic flux paths do not cross the center of the armature, to thereby achieve a magnetically neutral center.

It is another object of the invention to provide an armature having one piece laminations that are relatively easy to fabricate.

It is another object of the invention to provide an armature using ceramic type permanent magnets of efficient magnetic capability and design.

It is another object of the invention to provide an armature usable with variable frequency field windings to have a variable speed motor.

The foregoing and other objects and advantages of the invention will appear from the following description. In the description reference is made to the accompanying drawing which forms a part hereof, and in which there is shown by way of illustration and not of limitation two embodiments of the invention. Such embodiments do not represent the full scope of the invention, and reference is made to the claims herein for interpreting the breadth of the invention.

DESCRIPTION OF THE PREFERRED EMBODIMENTS

Figure 1:
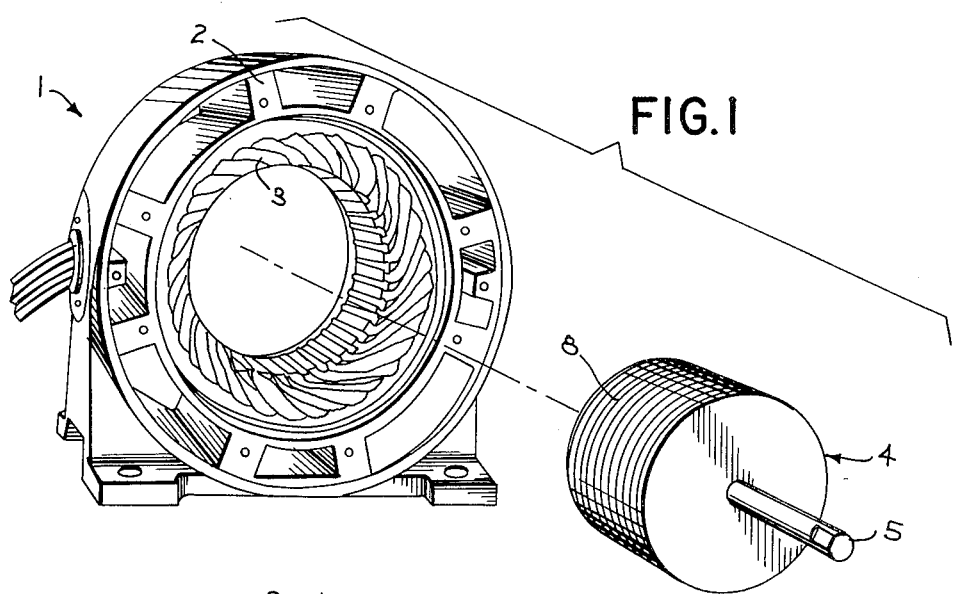
FIG. 1 is an exploded view in perspective of a motor stator and rotor in which the rotor comprises an armature embodying the present invention.

Referring now to the drawing, FIG. 1 shows a stationary motor stator 1 having a motor frame 2 in which is mounted a three-phase stator winding 3. The stator 1 illustrates a typical construction with which the present invention may be used, and the invention more particularly resides in a circular, cylindrical rotor 4 that comprises the motor armature. The rotor 4 is assembled into the stator 1, as in usual motor construction, and FIG. 1 is exemplary of the type of environment in which the invention may be employed. End bells, shaft mountings and the like are not shown in FIG. 1, for they are not a part of the invention, and usual constructions may be employed.

Figure 2:
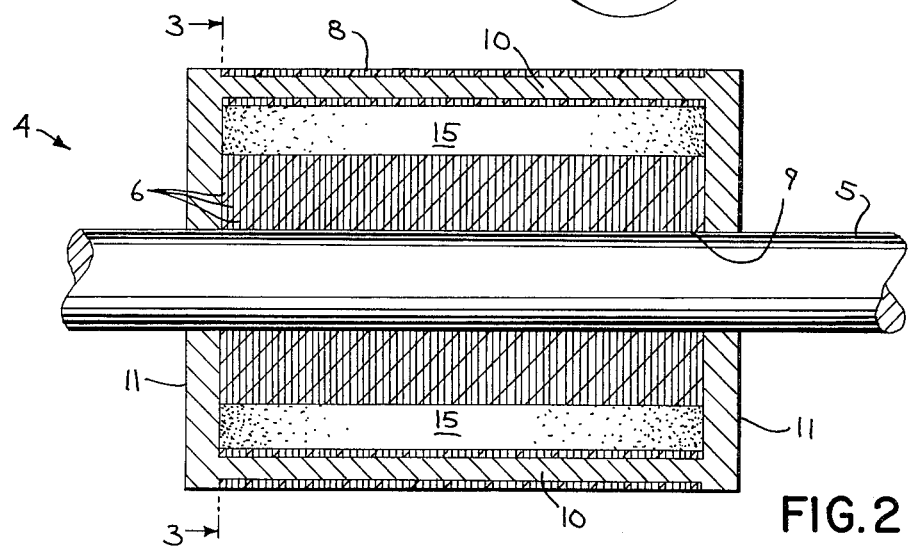
FIG. 2 is a view in longitudinal section of the armature shown in FIG. 1.
Figure 3:
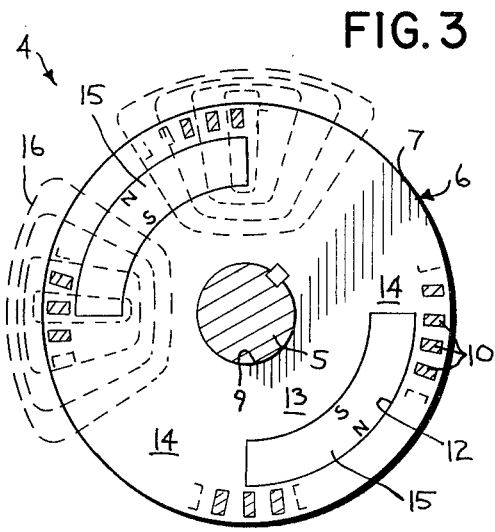
FIG. 3 is a view in cross section of the armature taken in the plane 3—3 indicated in FIG. 2.

Referring more specifically to FIGS. 2 and 3, there is shown therein the construction of the armature, or rotor 4 which embodies the permanent magnet design of the invention. A shaft 5 is provided that may be of any suitable material, either magnetic or non-magnetic, since the central region of the armature 4 at its axis is magnetically neutral with respect to the magnetic fluxes induced in the armature body. Mounted upon the shaft 5 is a plurality of closely stacked magnetic laminations 6 forming an armature core, each lamination having a configuration as shown in FIG. 3. The outer peripheral edge 7 of each lamination 6 forms a part of the air gap surface 8 of the armature 4 which is closely spaced from the face of the stator windings 3 to form the motor working gap. A center opening 9 in each lamination 6 is concentric with the outer periphery 7 and snugly fits about the shaft 5 with a keyed connection, so that the laminations rotate together with the shaft 5.

A plurality of electrically conductive rotor bars 10 extend axially through the armature 4 so as to pass through the radially outer margin region of each lamination 6, and the rotor bars 10 are electrically connected at their axial ends by a cast end plate 11. The rotor bars 10 and end plates 11 may be die cast of aluminum in accordance with usual armature construction, and the bars 10 form inductors in which armature current is induced in usual fashion by the rotating magnetic fields of the stator windings 3 to develop motor torque for motor start-up and bringing the armature up to speed. The rotor bars 10 are uniformly spaced circumferentially from one another, and in the particular embodiment shown there is a total of forty-four such bars 10 cast into mating slots formed in the laminations 6.

As seen in FIG. 3, a pair of diametrically opposite arcuate shaped openings 12 are formed in each lamination 6. Each opening 12 is set radially inward from the outer peripheral surface 7 directly behind the rotor bars 10, so as to be in close proximity to the air gap surface 8. Each arcuate opening 12 of the embodiment shown extends for an arc of approximately ninety mechanical degrees and is surrounded by a substantial magnetic flux path in the lamination 6 of which it is a part that comprises a radially inner region 13 located radially inside the opening 12 and two end regions 14 located at the opposite ends of the opening 12. The region 13 has an arcuate shape derived from the nature of its location between the shaft 5 and the radially inner edge of the associated opening 12, and this region 13 is of substantial radial depth approximately one-half the entire radial depth of the lamination 6. The regions 14 of an opening 12 are contiguous with similar regions 14 of the other opening 12, so that there is a large magnetic region between the ends of the openings 12 which extends circularly for approximately ninety mechanical degrees.

The openings 12 of the laminations 6 are aligned with one another, and snugly inserted into each resultant cavity is a ceramic permanent magnet 15 of matching arcuate shape that fills the cavity so as to be firmly seated therein. To obtain a positive seating of a magnet 15 a suitable cement can be used, but this is not necessary where a satisfactory snug fit is had. Each magnet 15 extends the entire axial length of the stack of laminations 6, as seen in FIG. 2, and the magnets 15 are polarized after casting the bars 10 and end plates 11 with magnetic poles along their radially outer and inner faces, as indicated by the pole identifications "N" and "S" in FIG. 3. Thus, each ceramic magnet 15 has one magnetic polarity extending across its radially outer arcuate surface which faces the motor working gap, and has its opposite magnetic polarity extending across its radially inner surface that faces the armature axis. The flux fields that are established by this manner of orienting the magnetic poles of the magnets 15 is illustrated by phantom lines 16 shown in FIG. 3 for one of the two magnets 15. The magnetic flux path emanating from the pole "N" crosses the motor working gap, travels through the magnetic material of the stator winding 3, and then recrosses the motor working gap to re-enter each lamination 6 in a region 14. The re-entry of the magnetic flux path extends a substantial circumferential distance around the lamination periphery 7, and the flux path loops around the rear, or radially inner face of the magnet 15 in the region 13 to enter the "S" pole of the magnet. There is thus provided a substantial magnetic linking path for the magnetic flux that enables the flux to link with each magnet by passing through a relatively large region of low reluctance steel. There are no special cuts or openings in the laminations 6 in addition to those for the rotor bars 10 and magnets 15 to force the flux from what might otherwise constitute flux shorting paths, and consequently the magnetic material is efficiently used.

The arcuate shape for the ceramic magnets 15 is a commonly used shape that can be readily manufactured in accordance with usual manufacturing techniques, and each magnet 15 is of sufficient size and geometry so that it can be of sturdy shape that admits of ready manufacture from ceramic magnet materials. It is desired to use a ceramic magnet because of its relatively large intrinsic coercive force. Such a magnet resists demagnetization from the motor field fluxes, and by having magnets of substantial circumferential extent adequate magnetic flux is provided. A typical type of ceramic magnet material that may be used in this application is type "M8" provided by the Allen-Bradley Company. This material is an oriented, ceramic permanent magnet material of low resistivity and of non-corrosive nature which is inert to most chemicals. It is magnetized after assembly to avoid handling problems and possible partial demagnetization that might otherwise take place during manufacture of the armature. These materials are anisotropic and must be magnetized in the direction of orientation, which in this instance is a radial direction across the arcuate shape of the magnets 15.

As has heretofore been noted, the flux return paths, or linking paths, in the armature 4 have substantial magnetic cross section area, so as to present a low reluctance to the magnetic fields of the magnets 15. The magnetomotive drops occur primarily in the motor working gap and slots for the motor windings. A highly efficient magnetic design is consequently obtained. A unique characteristic of the invention is that a pair of rotor poles are obtained for each magnet 15, so that the number of magnets required is reduced in number. Unique to this result is the presentation of one magnet polarity along the radially outward facing magnet surface and a second polarity along the radially inner magnet surface. The magnetic field of each magnet 15 fully links with the magnet, so that the two magnets of the embodiment shown are in magnetic parallel relation to one another, as distinguished from a series connection in which the flux paths each link with a pair of magnets. Unique to this construction is the presentation of the same magnetic polarity on the radial outer face of each magnet 15. In the illustration of FIG. 3, this common polarity is designated as the "N" pole.

In the embodiment shown, the circular, or circumferential, extent of each magnet 15 is approximately one hundred eighty electrical degrees, and then the return regions 14 associated with each magnet 15 also extend circularly for approximately one hundred eighty electrical degrees. It is desirable to have the circumferential extent of each magnet fall along its radially outer face within a range of about one hundred fifty to two hundred twenty electrical degrees, so that a balance is obtained between the circumferential extent of the flux emanating from a magnet 15 and the circumferential extent of the flux return path looping around to the radially inner, or back face of the magnet. It is also desirable to have a substantial radial distance for the regions 13, to maintain the flux densities in these regions of the armature within desired limits. The regions 13 are arcuate in shape because of the circularly concentric nature of the magnets 15, but if desired the magnets 15 need not be arcuate, or they may have a larger radius, so as not to be concentric with the laminations 6, and these changes in relative shapes can be made without departing from the invention.

The armature of FIGS. 1-3 is noteworthy for its simplicity of design. The magnets 15 are held in place by the substantial amount of encircling magnetic material of the laminations 6, and they are held axially in position by the die cast end plates 11. No special pins or retainers are necessary for this construction. There is therefore shown an improved rotor design for motors having fixed fields of permanent magnets. While the embodiment of FIGS. 1-3 utilizes a pair of magnets 15 to develop a four pole armature, the number of magnets can be changed to develop different numbers of poles as desired.

Figure 4:
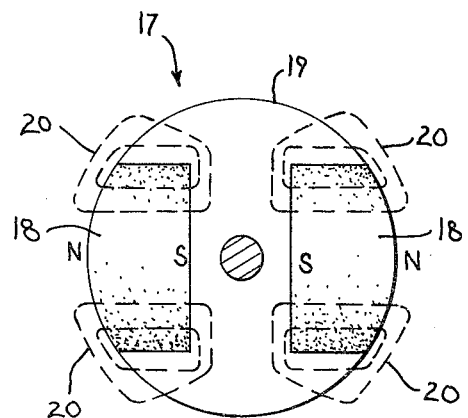
FIG. 4 is a view in cross section of an alternative form of armature embodying the invention.

Turning now to FIG. 4, there is shown an alternative form of armature 17 in which rotor bars are eliminated, so that the permanent magnets 18 can form a part of the armature surface. The laminations 19 of magnetic steel are of an I-shape, and the magnets 18 are held in place by a suitable adhesive, such as an epoxy. Each magnet 18 has the same magnetic polarity at its radially outer face as the other magnet 18, which is illustrated by the letter "N" in the drawing.

The flux paths are generally shown in FIG. 4 by the phantom lines 20, and it is apparent the magnetic relations are like those of the armature of FIGS. 1-3. There are two magnetic armature poles for each permanent magnet 18, and the magnets are magnetically in parallel. The radially inner faces of the magnets 18 are of like polarity, and therefore repel one another with the result the armature center, at the location of the shaft 21, is magnetically neutral.

In summation, the armature design of the invention orients permanent magnets circularly around an armature with each magnet presenting the same polarity to the armature surface. A substantial region of magnetic iron encircles the ends and radially inner faces of the magnets to have low reluctance magnetic linking paths for the magnetic flux, and with all the magnets having a like polarity at their radially inner faces the center of the armature, at the location of the armature shaft, is magnetically neutral.

We claim:

1. In an electric motor armature the combination comprising:

a magnetic core having a central axis and a peripheral air gap surface, said core including:

a number of circularly and radially extending permanent magnets disposed in the core that each have a magnetic pole of one polarity across its radially outer face and a magnetic pole of opposite polarity across its radially inner face, the radially outer face of each magnet being substantially concentric with said magnetic core;

each permanent magnet being enveloped by magnetic material of the core around its circularly spaced ends and along its radially inner face, the arcuate extent of the magnet being from 150 to 220 electrical degrees, and the magnetic material of the core located between the ends of said magnets extending for substantially the remainder of the circular extent of the core; and all said magnets having the same polarity at their radially outer faces and the opposite polarity at their radially inner faces, with a consequent substantially magnetic neutral condition at the armature axis.

2. An armature as in claim 1, wherein the number of permanent magnets is two, and the permanent magnets are disposed diametrically opposite one another.

3. An armature as in claim 1, wherein each permanent magnet is arcuately shaped along its radially inner and outer faces and concentric with the air gap surface.

4. An armature as in claim 1, wherein each permanent magnet is set back from the core air gap surface to thereby be surrounded by core material on all sides.

5. An armature as in claim 1, wherein each permanent magnet forms a part of the armature air gap surface.

* * * * *